S. E. FOSTER.
Running-Gears for Vehicles.
No. 154,751. Patented Sept. 8, 1874.
FIG. I.
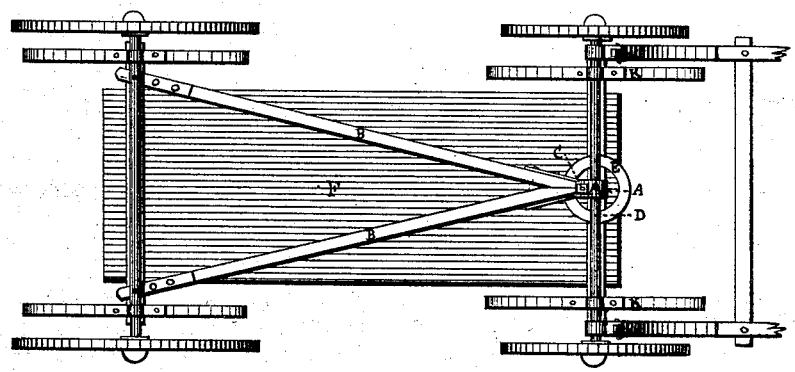
FIG. II.
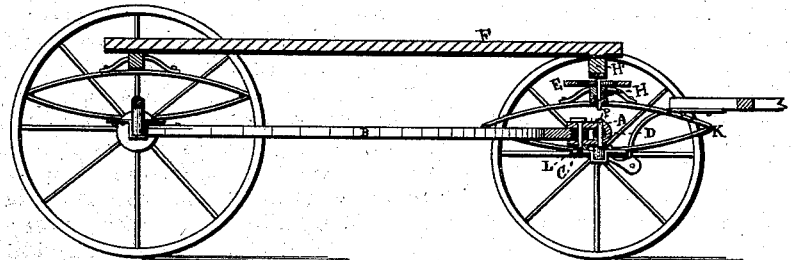
FIG. III.
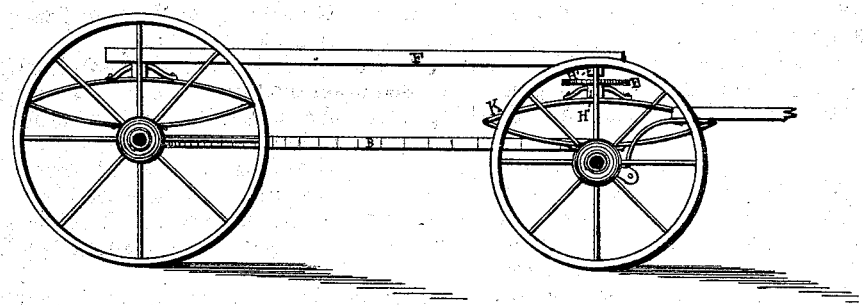

UNITED STATES PATENT OFFICE.

STEPHEN E. FOSTER, OF MINNEAPOLIS, MINNESOTA.

IMPROVEMENT IN RUNNING-GEARS FOR VEHICLES.

Specification forming part of Letters Patent No. 154,751, dated September 8, 1874; application filed August 5, 1874.

*To all whom it may concern:*

Be it known that I, STEPHEN E. FOSTER, a resident of the city of Minneapolis, county of Hennepin and State of Minnesota, have invented certain new and useful Improvements in Reach-Couplings for Vehicles, of which the following is a full, clear, and exact description:

Figure 1 is a bottom view of a vehicle. Fig. 2 is a longitudinal center sectional view of Fig. 1, taken through the line *x y;* and Fig. 3 is a side view.

The same letters of reference are used in the various figures in the designation of identical parts.

My invention relates to that class of inventions wherein the fifth-wheel is placed and operated on top of a perch connecting two springs placed upon the forward axle. The object of my invention is to produce such an effective mode for coupling the reach to the forward axle as shall allow of a spring being attached to both ends of said axle, transferring the weight thereby from the center to a point close to the inner side of the wheels upon the forward axle.

I am aware that springs have heretofore been placed upon the forward axle in such manner as is herein described and shown, but I do not know or believe that the mode of coupling the reach to the forward axle herein described has ever been known or used by others previous to my invention.

The reach B, as shown in Fig. 1, may be modified to suit the style of vehicle it is used on. The shackle-coupling A partially encircles the axle D, and is placed in its center. It is formed of a single piece of iron bent to the shape shown in Fig. 2, and has a hole punched in its upper projecting part suitable to receive a bolt, a hole formed in its lower projecting part being tapped out that the bolt C may be screwed into it. A binder-nut, L, Fig. 2, is used upon the lower end of the bolt C, to better secure it in its required position. An iron strap, L, encircles the end of the reach B, and has a suitable hole in it so that when placed in position between the jaws of the shackle A the bolt C may pass through it, and thereby secure it properly. A steel rivet, P, passes through the shackle A and axle D, securely holding the said shackle in place. The center of the fifth-wheel is placed in line with the center of the shackle-bolt C. The springs K are placed just within the wheels, and are securely fastened to the axle D. The spring-bar H connects the springs K K together, and the fifth-wheel E is centrally placed thereon, a metal plate being fastened to the bar H', which is a part of the body F, for the body to work upon.

By the use of this coupling two springs may be used upon the forward axle without detracting from the strength and durability of the vehicle as a whole; but, on the contrary, rather increasing the same, as well as adding to the beauty and simplicity of the vehicle.

Having thus described my invention, what I claim as new, and want to secure by Letters Patent, is—

The shackle A and reach B, in combination with springs K K, spring-bar H, fifth-wheel E, perch H', and body F, substantially as and for the purpose set forth.

STEPHEN E. FOSTER.

Witnesses:
F. M. COMSTOCK,
H. O. HAMLIN.